UNITED STATES PATENT OFFICE 2,653,968

CHOLINE PANTOTHENATE AND METHOD FOR MANUFACTURING SAME

Myer Freed, Chicago, Ill., assignor to Dawe's Products Company, Chicago, Ill., a corporation of Illinois No Drawing. Application March 29, 1952,
Serial No. 279,459

4 Claims. (Cl. 260—482)

This invention relates to the preparation of choline pantothenate and intermediates used in the manufacture thereof and it is an object of this invention to produce and to provide a method for producing choline pantothenate.

To my knowledge, no one before has produced synthetically or otherwise a choline pantothenate. In experimentation with choline pantothenate, prepared in accordance with this invention, it has been found that the compound has a marked stimulating effect on bacterial growth and on growth generally, especially in livestock, poultry and the like, and it provides a very active and desirable ingredient in feed for poultry, swine, livestock and the like.

In accordance with the present invention, it has been found that choline pantothenate may be prepared economically and in good yield by reaction of alpha-hydroxy-beta, beta-dimethyl-gamma-butyrolactone with choline beta-alanate or with beta-alanine choline hydroxide. Unlike the reactions characteristic of the manufacture of pantothenic acid and its metal salts from the lactone in the presence of alkali or alkaline earth metal hydroxides, large excesses of lactone are not required in the practice of this invention possibly because of steric hindrance to competing reactions. Competing reactions often requiring three times the theoretical amount of lactone have been found to take place during the reaction of beta-alanine and lactone in the presence of alkali and alkaline earth metal hydroxides. It is believed that such bases function to saponify the lactone whereby undesirable by-products are formed and considerable amounts of lactone are consumed to reduce the yield therefrom.

The invention will be described in greater detail in conjunction with the following specific examples. It should be understood however that these examples are given merely by way of illustration, and not by way of limitation.

Example 1

79 grams isobutyraldehyde is reacted with 88 grams of 37 percent formalin in a cooled vessel by slowly adding a 30 percent solution of sodium cyanide. Precautions should be taken during the addition of sodium cyanide to maintain the temperature during reaction to below about 25° C. When the extent of temperature rise is lessened, the amounts of cyanide solution may be increased until about 180 cc. of solution or about 54 grams of sodium cyanide have been introduced.

About 80 cc. of concentrated hydrochloric acid is added to the reaction product of sodium cyanide with isobutyraldehyde and formalin. The addition of acid is made in small increments accompanied by constant stirring and cooling. About 20 minutes is required for the addition of the acid and then the mixture is continued to be stirred and cooled for an additional hour. Thereafter 120 cc. of concentrated hydrochloric acid is slowly added and then the mixture is allowed to stand for at least 4 hours and preferably overnight.

The mixture is neutralized to litmus with about 45 percent potassium hydroxide and the alpha-hydroxy-beta, beta-dimethyl-gamma-butyrolactone formed as a product is extracted therefrom by solution in ethylene dichloride. Usually more than one and as many as five or six extractions are made and the extractions combined for subsequent use, with or without concentrating. Instead of ethylene dichloride, other chlorinated low hydrocarbons such as methyl chloride, chloroform and the like may be used. Lactone prepared by other methods or by the method described may also be dissolved in higher aliphatic alcohols preferably of the branch chain type, such as tertiary amyl alcohol, isobutyl alcohol and the like, or ethers of the type isopropyl ether. Such solutions of the lactone in solvents may be used, as will hereinafter be described, in the preparation of choline pantothenate.

Example 2

In a separate container, 89 grams beta-alanine are reacted upon solution in 363 grams of a 33 percent solution of choline hydroxide to form choline beta-alanate. Non-reactive solvents other than alcohols may be substituted in whole or in part, if desirable, for the aqueous medium in which the choline beta-alanate is formed.

Example 3

The extract from Example 1, concentrated to about 500 cc., is slowly added with constant stirring and cooling to the reaction product of Example 2. Stirring is continued further until the choline beta-alanate is substantially completely reacted with the lactone as determined by formol titration. The aqueous phase containing choline pantothenate is separated out by decantation or the like from the solvent phase which may be returned for reuse in Example 1. A yield of 95 percent or 297 grams of DL choline pantothenate is produced. Upon slow evaporation of the water, crystals of DL choline pantothenate may be secured.

While the reaction to form choline pantothenate may be carried out successfully with the lactone and choline beta-alanate in equimolecular proportions, it is preferred to make use of an excess of about 10 percent lactone to insure the more complete utilization of choline beta-alanate.

*Example 4*

By way of modification, the lactone for use in the separation of choline pantothenate, as in Example 2, may be prepared by reacting 79 grams of isobutyraldehyde with 88 grams or 37 percent formaldehyde by slow addition of 54 grams sodium cyanide in solution while cooling and stirring to keep the temperature below 30° C.

200 cc. of 45 percent potassium hydroxide or sodium hydroxide is added to the above reaction product and the mixture distilled until no more ammonia is formed. The mixture is then neutralized to litmus with hydrochloric acid and extracted with tertiary amyl alcohol.

It will be understood that alpha-hydroxy-beta, beta-dimethyl-gamma-butyrolactone prepared by other methods may be used in the preparation of choline pantothenate in accordance with the practice of this invention and that the choline beta-alanate produced herein as an intermediate in the manufacture of choline pantothenate also constitutes a new product capable of separate manufacture and their use is therefore included as a subject of this invention.

It will be further understood that the proportions of ingredients used for the preparation of the lactone and choline beta-alanate and the proportions of lactone and choline beta-alanate for the preparation of choline pantothenate may be varied slightly from the amounts defined in the examples, though possibly with slightly lower yields, without departing from the spirit of the invention, especially as defined in the following claims.

I claim:

1. Choline pantothenate having the formula

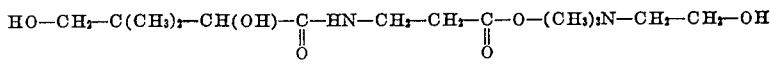

2. In the process for the manufacture of the salt of choline beta-alanate and alpha-hydroxy-beta, beta-dimethyl-gamma-butyrolactone, the step of reacting the lactone with substantially equimolecular equivalents of choline beta-alanate in a neutral solvent selected from the group consisting of water and alcohol.

3. In the process for the manufacture of the salt of choline beta-alanate and alpha-hydroxy-beta, beta-dimethyl-gamma-butyrolactone, the step of reacting the lactone with choline beta-alanate at room temperature in a neutral solvent with the lactone and choline beta-alanate being present in about equimolecular proportions up to an excess of about 10 percent of the lactone.

4. In the process for the manufacture of the salt of beta-alanine choline hydroxide and alpha-hydroxy-beta, beta-dimethyl gamma-butyrolactone, the steps of adding the lactone slowly with agitation to a solution of the beta-alanine choline hydroxide in neutral solvent at about room temperature, continuing the addition of the lactone until the beta-alanine choline hydroxide is substantially completely reacted as determined by formol titration, separating the phase containing the salt in solution from the remainder and evaporating the solution to precipitate the salt as choline pantothenate having the formula

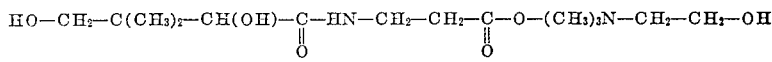

MYER FREED.

References Cited in the file of this patent

UNITED STATES PATENTS

| Number | Name | Date |
|---|---|---|
| 2,557,284 | Harris et al. | June 19, 1951 |

OTHER REFERENCES

Freudenberg et al.: Ber. Deut. Chem., vol. 71B, pp. 329–34 (1938). Stedman: "Stedman's Medical Dictionary," 17th rev. ed., Williams and Wilkins Co., Baltimore, Md., 1949, p. 1309.